United States Patent [19]

Nevis et al.

[11] Patent Number: 6,108,454
[45] Date of Patent: Aug. 22, 2000

[54] LINE CONTRAST DIFFERENCE EFFECT CORRECTION FOR LASER LINE SCAN DATA

[75] Inventors: Andrew J. Nevis; Gerald J. Dobeck, both of Panama City, Fla.

[73] Assignee: The United States of America as represented by the Secretary of the Navy, Washington, D.C.

[21] Appl. No.: 09/066,707

[22] Filed: Apr. 27, 1998

[51] Int. Cl.[7] .................................................. G06K 9/44
[52] U.S. Cl. ......................... 382/255; 382/264; 382/275
[58] Field of Search ................................. 382/260, 255, 382/264, 275, 280; 702/190, 191, 192, 193, 194, 195; 708/405

[56] References Cited

U.S. PATENT DOCUMENTS

| 4,234,880 | 11/1980 | Klemm | 343/5 |
| 4,897,878 | 1/1990 | Boll et al. | 381/43 |
| 5,466,882 | 11/1995 | Lee | 84/603 |

*Primary Examiner*—Scott Rogers
*Assistant Examiner*—Sankar Persaud
*Attorney, Agent, or Firm*—Harvey A. Gilbert; Donald G. Peck

[57] ABSTRACT

Line contrast difference effect which limits the capabilities of laser line scan (LLS) sensors is substantially reduced by a process that uses a smoothing array, modified based upon a mean magnitude array of all columns of a discrete Fourier transform (DFT) of an image matrix. Trouble frequencies (both small band width and large band width) indicative of line contrast difference effect are identified from the mean magnitude DFT array using a linear least squares error method. The same technique is used to calculate suppression values for each of the identifiable trouble frequencies and the smoothing array is modified thereby. Once all modifications are made to the smoothing array, it is applied to the mean magnitude DFT array to suppress those pixels of the array that are associated with trouble frequencies. The corrected mean magnitude DFT array is then subject to an inverse DFT function for each column in the array to reconstruct the original image, now in corrected form, to be saved for display or storage.

14 Claims, 1 Drawing Sheet

LINE CONTRAST DIFFERENCE EFFECT CORRECTION FOR LASER LINE SCAN DATA

TECHNICAL FIELD

The present invention pertains to the enhanced operation and control of laser line scan sensors that are used in a variety of different applications, such as underwater detection. In particular, the present invention is directed to the correction of line contrast difference effect to further enhance the image provided by laser line scan sensors.

BACKGROUND OF INVENTION

A wide variety of different sensor types are used to detect objects in places and mediums other than air. Of particular interest are sensors that are used for scanning for objects (such as mines) that have been deposited under water. Such sensors are also used to detect under water topological formations that are indicative of mineral deposits or other features of interest. One type of sensor that is used in such applications is the laser line scan (LLS) sensor.

Laser line scan sensors generate images one line at a time. This is accomplished by using four mirrors attached to a spindle that reflects returned photons into four channels, with each group of four channels having a gain applied to it. Sometimes the effective gains of the scan lines become unequal causing contrast differences between the lines. This problem is attributed to not only each mirror (representing a channel) having a slightly different reflectance property, but also because each group of four channels (representing four lines per spindle rotation) may have different gains applied to them.

One technique used to correct this line contrast difference effect is to average the mean signal values of every four lines (corresponding to a single spindle rotation). However, this technique is deficient in that the trouble frequencies that cause the line contrast difference effect are not restricted to being periodic at a rate of every fourth line. Thus, this mean line averaging technique can correct only a few of the trouble frequencies associated with line contrast difference effect.

Fourier analysis techniques have been used in the past to remove unwanted noise frequencies. However, such techniques have not been applied to LLS data, and the algorithms used were manual, and so did not automatically identify trouble frequencies. In conventional systems identification of the trouble frequencies causing the line contrast difference effect is difficult. Further, such conventional systems operated to "zero out" trouble frequencies instead of suppressing them. Consequently, conventional systems can not detect and suppress a wide range of trouble frequencies associated with line contrast difference effect. Also, conventional systems do not eliminate Gibbs Effect, which causes the slight ringing that is common with filters using a sharp cut-off. Because of these drawbacks, the conventional art can provide only limited effectiveness for laser line scanners detecting for objects in turbulent or deep water.

SUMMARY OF INVENTION

Accordingly, it is one object of the present invention to automatically correct line contrast difference effect found in laser line scan data.

It is another object of the present invention to correct for line contrast difference effect in a laser line scanner without deteriorating frequencies containing useful image data.

It is yet a further object of the present invention to correct line contrast difference effect in laser line scan data while minimizing the undesirable results of Gibbs Effect.

These and other objects, goals and advantages of the present invention are achieved by a method of operating a laser line scanner which scans in a two-dimensional image. A one-dimensional forward discrete Fourier transform (DFT) is applied to each column of the image matrix. Next, a smoothing array is initiated based upon the mean magnitude of all the DFT columns. This smoothing array is initialized with coefficient values of one and low pass filter values are applied to the smoothing array. Then, the trouble frequencies are identified and appropriate suppression values are computed from a mean magnitude DFT array and applied to the smoothing array. The modified smoothing array is then applied to each column of the DFT mean magnitude array. In this way the frequency suppression of the trouble frequencies and the low-pass filtering is achieved for the DFT array. Afterwards, an inverse DFT is applied to each column of the DFT to reconstruct the original image in corrected form.

DETAILED DESCRIPTION OF THE PREFERRED EMBODIMENTS

Figure 1:
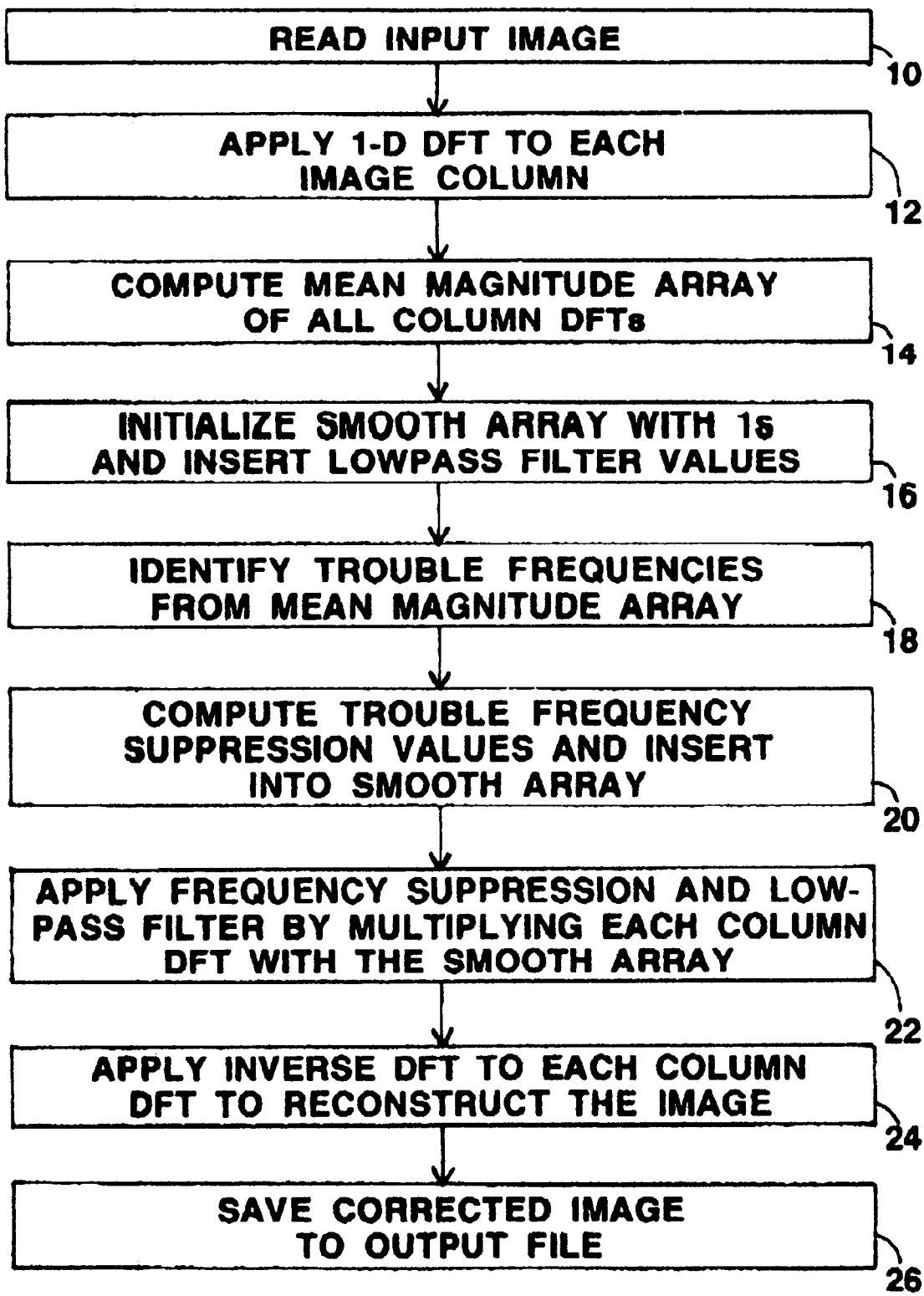
FIG. 1 is a flow diagram depicting the process of the present invention.

FIG. 1 is a flow diagram depicting the logic of a Fourier transform program (included as Appendix I of this application) that is directed to correct line contrast difference effect for laser line scan data. The correction technique of the present invention includes the application of Discrete Fourier Transforms (DFT) to a two-dimensional image. The transformed image is manipulated using a smoothing array which in turn has been configured using a calculation of the mean magnitude of the DFT array and a least squares error estimate to identify and compensate for trouble frequencies. These trouble frequencies are suppressed rather than eliminated by the inventive process. The modified smoothing array is then applied to the DFT array.

The image is then reconstructed by taking the one-dimensional inverse DFT of each DFT image column. By suppressing the trouble frequencies but not eliminating them, the line effect can be reduced while minimizing Gibbs Effect, which can occur whenever using Fourier analysis techniques.

The advantage of this technique over the mean line averaging method is that it can detect and suppress a wide range of trouble frequencies causing the line contrast different effect instead of a narrow range of trouble frequencies. Also, because the line correction is performed in the Fourier domain, it is easier to identify and suppress the trouble frequencies causing the line effect (and not desired frequencies that contain information about the image), than would be if performed spatially like the mean line averaging method.

At step 10 as depicted in FIG. 1, the image data is obtained using a laser line scanner in a manner well-known in this technology. Further elaboration on conventional techniques used in laser line scanning are provided in the following documents, incorporated herein by reference : CSS Technical Report Number CSS/TR/94/45; and, CSS Technical Paper Number CCS/TR/96/52.

At step 12, a one-dimensional forward discrete Fourier transform (DFT) is applied to each column of the image in a manner well-known in the noise-reduction art. However, while Fourier analysis techniques have been used before to remove unwanted noise frequencies, such techniques have not been applied to laser line scan (LLS) data.

As indicated at Step 14, the mean magnitude array of all of the DFT columns is computed by taking the average of the pixel magnitude along each column. Further elaboration on these techniques are found in Appendix II attached hereto and incorporated herein by reference, as disclosing an article by Andrew Nevis entitled *Low Contrast Enhancement For Electro-Optic Data*. Further background is found in the following articles incorporated herein by reference : A. J. Nevis and G. J. Dobeck *Image Enhancement For Mine Identification, CSS TR-94/45*; A. J. Nevis, *Low Contrast Enhancement For Electro-Optic Data CSS TR-94/52*; A. J. Nevis, *Image Characterization Target Recognition in the Surf Zone Environment, CSS TR-96/19*; and, D. Brown, Status Report : *Electro-Optic Image Processing/Analysis*, Penn State University Applied Research Laboratory.

A smoothing array is generated at step 16 to be modified and eventually applied to each column of the DFT array formed at step 12 in order to remove the line contrast difference effect. This initiating step is constituted by two substeps as follows.

In the first substep, the smoothing array is generated to have the same column size as the DFT array of step 12. Each pixel of the new smoothing array has an initial value of 1.

In the second substep it is necessary to apply a gradual lowpass filter to the smoothing array in the following manner. If the size of a row in the matrix of the smoothing array is 2048 pixels, then the values originally applied to the smoothing array should be a value of 1 to pixel number 300 and a value of 0 to pixel number 1025. All pixel values between these two values (1 and 0) are linearly interpolated for pixel numbers 301–1024. The resulting smoothing array elements are reflected about pixel position 1025 to fill in the remainder of the pixel values for the smoothing array.

If, on the other hand, the size of a row is 1024 pixels, the same process is used but pixel positions 100 and 513 pixels are selected for values of 1 and 0 respectively, instead of 300 and 1026 (as is done with the aforementioned larger array). The resulting smoothing array pixel values are reflected about the pixel at position 513.

At step 18 of the process, all bandwidth trouble frequencies are identified from the column mean magnitude DFT array generated at step 14. Then the amount of appropriate suppression needed to correct the line contrast difference effect using the smoothing array is computed. A linear least squares error method is used to accomplish this by carrying out the following substeps.

In the first substep, the small or narrow bandwidth trouble frequencies are identified using the mean magnitude DFT array generated at step 14. If the size of a row is 2048 pixels, this identification is accomplished by comparing each pixel value from the mean magnitude DFT array for pixel numbers 51–1025 against the least squares error estimate for each of pixels 51–1025. This least squares error estimate is computed using the $\log_{10}$ value of the mean magnitude DFT array pixels located at 6–10 positions to the left and right of each pixel in question (for an average based upon 10 pixel values), but not the value of the pixel in question itself or the values of that pixel's nearby tangential pixels. If the $\log_{10}$ value of the pixel in question is greater than 1.01 times its least squares error estimate value, then the pixel in question is considered to represent a DFT coefficient corresponding to a trouble frequency.

Once the small bandwidth trouble frequencies have been identified at step 18, the amount of suppression needed to correct the line contrast difference effect associated with each trouble frequency is computed. The trouble frequencies will be suppressed in each column of the mean magnitude DFT array by reducing the corresponding pixel value in the smoothing array (step 20). The modified smoothing array already contains the lowpass filter information and the corresponding trouble frequency will be further reduced proportional to the difference between the $\log_{10}$ value of the pixel in question and the value of its least squares error estimate. The correct smoothing array pixel values for suppression are provided by reducing the value of the corresponding smooth array pixel in question with the quotient of the least squares error estimate divided by the $\log_{10}$ value of the pixel in question (the quotient will have a value less than 1). The value of the corresponding smooth array pixel (less than 1) is further reduced by raising it to the fourth power. The modified smoothing array pixel values are then reflected about pixel position 1025 of the smoothing array.

If, on the other hand, the size of a row is 1024 pixels, then the same process described above is carried out. However, only pixel positions 51–513 are used instead of pixel positions 51–1025. Also, pixel positions 5–8 are used on each side of the pixel at issue instead of pixel positions 6–10. The modified smoothing array pixel element values are reflected about pixel position 513 instead of pixel position 1025 of the smoothing array.

Step 18 is then repeated to identify large bandwidth trouble frequencies from the mean magnitude DFT array of step 14 and compute the amount of suppression needed to correct the line contrast difference effect using the smooth array. The identification is carried out using a linear least squares error method in the following manner.

Large bandwidth trouble frequencies are identified applying the exact same process previously described with respect to small bandwidth trouble frequencies), only using pixels 101–1025 of the mean magnitude DFT array instead of pixel numbers 51–1025 to search for corresponding large bandwidth trouble frequencies. Also, pixel position 80–100 are used instead of pixel positions 6–10 (for a total of 42 pixel values) for the least squares error estimate for each pixel of interest.

Step 20 is repeated to compute the amount of suppression needed for large bandwidth trouble frequencies is computed in the same manner as is done for small bandwidth trouble frequencies. The suppression for large bandwidth trouble frequencies is compounded to the adjustments made for the suppression of the small bandwidth trouble frequencies in the smoothing array, and are not applied to a separate smoothing array.

If there are only 1024 pixels in a row, then the same process as described with respect to a larger array is computed. However, only pixel positions 81–513 are used instead of pixel positions 101–1025, and pixel positions 60–80 are used instead of pixel positions 80–100. The modified smoothing array pixel values are reflected about pixel position 513 instead of pixel position 1025 to fill in the pixel walls of the modified smoothing array.

At step 22 the trouble frequencies (both small and large bandwidths) in each column of the mean magnitude DFT array are suppressed. This is accomplished by multiplying each column of the mean magnitude DFT array with the corresponding pixel values of the modified smoothing array, on a pixel-by-pixel basis.

At step 24, a one-dimensional inverse DFT to each column of the mean magnitude DFT array (of step 12) is computed to reconstruct the corrected image.

At step 26, the corrected image is printed or otherwise copied to an output file.

As a result of the process practiced with the present invention, greater effectiveness is achieved for LLS sensors, permitting the detection of underwater objects (such as mines) that would otherwise be very problematical with conventional techniques. This is due to the suppression of trouble frequencies rather than the elimination of them which could corrupt useful image information.

Although one embodiment of the present invention has been described by way of example, the present invention is not limited thereby. Rather, the present invention should be considered to include any and all variations, permutations, modifications and logical applications that would occur to one skilled in this art based upon the disclosed invention. Consequently, the present invention should be construed to be limited only by the following claims.

Appendix I

DIANA::NEVIS

JOB 326

AUTOFFT.FOR;1

File: _$40$DKB203:[NEVIS.PSTAR]AUTOFFT.FOR;1
Last Modified: 23-JAN-1998 07:41
Owner UIC: [HARH,NEVIS]

Length: 22 blocks
Longest record: 80 bytes
Priority: 100
Submit queue: LASER_B1102C
Submitted: 16-APR-1998 08:32
Printer queue: LASER_B1102C
Printer device: LPS17A Digital Equipment Corporation
OpenVMS Alpha V7.1

PrintServer 17 LPS17A
DECprint Supervisor V1.4 autofft.for;1                                                                 Page 1

```fortran
1         program linefft
2
3   C***********************************************************************
4   C*
5   C***********************************************************************
6
7         character     infile*64, infile1*64, infile2*64
8         byte          pt1(512), pt2, hdr(512)
9         logical*2     lpt1(256)
10        integer       im(2048,2048), irow, jcol, imax
11
12        common/names/infile
13        equivalence (lpt1,pt1)
14
15        print*, ' What is the name of the input file?'
16        read(*,10) infile
17   10   format(a64)
18        infile1 = infile
19        open(unit=1, file=infile, recl=512, recordtype='fixed',
20      &          status='old')
21
22        call lib$init_timer()
23        call readfile(im,irow,jcol,hdr,imax)
24        call lib$show_timer()
25
26        call colfft(im,irow,jcol,imax)
27        call lib$show_timer()
28
29        infile(13:14)=infile(11:12)
30        infile(10:12)='fft'
31           open(unit=2, file=infile, recl=512, recordtype='fixed',
32      &          status='new')
33
34           write(2, 15) hdr                      ! First write header
35           do i = 1, irow
36              do j = 1, jcol/256
37                 do k = 1, 256
38                    lpt1(k) = im(i,k+(j-1)*256)
39                 enddo
40                 write(2, 15) pt1
41   15          format(512a1)
42              enddo
43           enddo
44        call lib$show_timer()
45
46        stop
47        end
48
49   ***********************************************************************
50
51        subroutine readfile(im,irow,jcol,hdr,imax)
52
53        character     infile*64
54        byte          pt1(512), pt2, hdr(512)
55        logical*2     lpt1(256)
56        integer       im(2048,2048), irow, jcol, nbit, imax
57
58        common/names/infile
59        equivalence (lpt1,pt1)
60
61        open(unit=1, file=infile, recl=512, recordtype='fixed',
62      &          status='old')
63
64   C*  READ BINARY IMAGE AND CONVERT TO INTEGER WITH ZEXT FUNCTION
65
66        read(1,11) pt1                 ! First read in header
67        do k = 1, 512
68           hdr(k)=pt1(k)
69        enddo
70        irow = zext(lpt1(2))           ! Bytes 3 and 4 in hdr are # rows
```

```
               jcol = zext(lpt1(3))/2         ! Bytes 5 and 6 in hdr are # cols
               nbit = zext(lpt1(6))           ! Bytes 7 and 8 in hdr are # bits imax = 2**nbit - 1 do i = 1, irow
                  do j = 1, jcol/256
                     read(1,11) pt1
      11             format(512a1)
                     do k = 1, 256
                        im(i,k+(j-1)*256) = zext(lpt1(k))
                     enddo
                  enddo
               enddo close(1)
               return
               end c************************************************************************ subroutine colfft(arr,irow,jcol,imax)

c************************************************************************
c*
c* THIS PROGRAM CORRECTS THE EVEN-ODD LINE GREYLEVEL PROBLEM DETECTED IN THE
c* MHK IMAGES.  THIS IS ACCOMPLISHED BY TAKING THE FOURIER TRANSFORM OF THE
c* IMAGE COLUMNS, DELETING THE INFECTING POINT, THEN TAKING THE INVERSE
c* FOURIER TRANSFORM TO OBTAIN THE CORRECTED IMAGE.
c*
c************************************************************************ integer       arr(2048,2048)

complex*8     four(2048,2048), imcol(2048)

real          mean(2048), smooth(2048)

c*   CONVERT FROM INTEGER TO COMPLEX do j = 1, jcol
                  do i = 1, irow
                     four(i,j) = cmplx(float(arr(i,j)),0.0)
                  enddo
               enddo
               do i = 1, irow
                  mean(i) = 0.0
               enddo c* COMPUTE THE FOURIER TRANSFORM VIA AN FFT sign = -1.0 c APPLY 1-D FFT TO IMAGE TO COLUMNS if(irow.eq.2048) then
                  do j = 1, jcol
                     do i = 1, irow
                        imcol(i) = four(i,j)      ! Ith column of image
                     enddo
                     call nlogn(11, imcol, sign)
                     do i = 1, irow
                        four(i,j) = imcol(i)
                     enddo
                  enddo
               else
                  do j = 1, jcol
                     do i = 1, irow
                        imcol(i) = four(i,j)      ! Ith column of image
                     enddo
``` autofft.for;1                                                              Page 3

```
141                call nlogn(10, imcol, sign)
142                do i = 1, irow
143                   four(i,j) = imcol(i)
144                enddo
145             enddo
146          endif
147
148  c* TAKE AVERAGE MAGNITUDE ACROSS THE ROWS
149
150          do i = 1, irow
151             gmin = 9999.0
152             do j = 1, jcol
153                mean(i) = mean(i) + cabs(four(i,j))
154             enddo
155          enddo
156
157  c*   SMOOTH OUT LINE AND ELIMINATE TROUBLE FREQUENCIES
158
159          call smoothout(mean,smooth,irow,jcol)
160
161          do j = 1, jcol
162             do i = 1, irow
163                four(i,j) = four(i,j)*smooth(i)
164             enddo
165          enddo
166
167  c* COMPUTE THE FOURIER INVERSE TRANSFORM VIA AN FFT
168
169          sign = 1.0
170
171  c APPLY 1-D FFT INVERSE TO IMAGE TO COLUMNS
172
173          if(irow.eq.2048) then
174             do j = 1, jcol
175                do i = 1, irow
176                   imcol(i) = four(i,j)          ! Ith column of image
177                enddo
178                call nlogn(11, imcol, sign)
179                do i = 1, irow
180                   four(i,j) = imcol(i)
181                enddo
182             enddo
183          else
184             do j = 1, jcol
185                do i = 1, irow
186                   imcol(i) = four(i,j)          ! Ith column of image
187                enddo
188                call nlogn(10, imcol, sign)
189                do i = 1, irow
190                   four(i,j) = imcol(i)
191                enddo
192             enddo
193          endif
194
195  c*   CONVERT FROM COMPLEX TO INTEGER
196
197          do j = 1, jcol
198             do i = 1, irow
199                arr(i,j) = nint(cabs(four(i,j)))
200             enddo
201          enddo
202
203          return
204          end
205
206  c****************************************************************************
207  c**                                                                        **
208  c**      subroutine nlogn                                                  **
209  c**                                                                        **
210  c****************************************************************************
``` autofft.for;1

```
      subroutine nlogn(n, x, sign)

dimension    m(11)
      dimension    x(2048)
      complex*8    x, wk, hold, q
      integer      n
      real         sign lx = 2**n
      do 1 i = 1,n
          m(i) = 2**(n-i)
1     continue do 4 l = 1,n
          nblock = 2**(l-1)
          lblock = lx/nblock
          lbhalf = lblock/2
          k = 0
          do 4 iblock = 1, nblock
              fk = k
              flx = lx
              v = sign*6.2831853*fk/flx
              wk = cmplx(cos(v),sin(v))
              istart = lblock*(iblock-1)
              do 2 i = 1, lbhalf
                  j = istart + i
                  jh = j + lbhalf
                  q = x(jh)*wk
                  x(jh) = x(j) - q
                  x(j) = x(j) + q
2             continue
              do 3 i = 2,n
                  ii = i
                  if(k .lt. m(i)) go to 4
                  k = k - m(i)
3             continue
4         k = k + m(ii)

k = 0
      do 7 j = 1, lx
          if(k .lt. j) go to 5
          hold = x(j)
          x(j) = x(k+1)
          x(k+1) = hold
5         do 6 i = 1,n
              ii = i
              if(k .lt. m(i)) go to 7
              k = k - m(i)
6         continue
7     k = k + m(ii)

if(sign .lt. 0.0) return
      do 8 i = 1, lx
          x(i) = x(i)/flx
8     continue
      return
      end c************************************************************************ subroutine smoothout(mean,smooth,irow,jcol)

real    mean(2048), smooth(2048), sum, slope, x1, x2, arr(151),
     &        y1, y2, y, val integer imask, ipt, m do i = 1, irow
          smooth(i) = 1.0
``` autofft.for;1

```
281            enddo
282
283            if(irow.eq.2048) then
284               x1 = 300.0
285               x2 = 1025.0
286               y1 = 1.00
287               y2 = 0.00
288               slope = (y2-y1)/(x2-x1)
289               do i = nint(x1), 1025
290                  y = slope*(float(i)-x1) + y1
291                  smooth(i)=y
292                  smooth(2050-i)=smooth(i)
293               enddo
294
295            else
296               x1 = 100.0
297               x2 = 513.0
298               y1 = 1.00
299               y2 = 0.00
300               slope = (y2-y1)/(x2-x1)
301               do i = 100, 513
302                  y = slope*(float(i)-x1) + y1
303                  smooth(i)=y
304                  smooth(1026-i)=smooth(i)
305               enddo
306            endif
307
308   c*  USE A LEAST SQUARES LINE TO DETECT MOST TROUBLING FREQUENCIES THAT
309   c*  NEED STRONGER SMOOTHING OUT
310
311            if(irow.eq.2048) then
312               do i = 51, 1025               ! First look for small peaks
313                  m=0
314                  do k = i-10, i-6
315                     m=m+1
316                     arr(m) = log10(mean(k)+1.0)
317                  enddo
318                  do k = i+6, i+10
319                     m=m+1
320                     arr(m) = log10(mean(k)+1.0)
321                  enddo
322                  call equil(arr,m,val)
323                  if(log10(mean(i)+1.0).gt.1.01*val) then
324                     wt = val/log10(mean(i)+1.0)
325                     smooth(i)=(smooth(i)*wt)**4
326                     smooth(2050-i)=smooth(i)
327                  endif
328               enddo
329
330               do i = 101, 1025              ! Next look for large peaks
331                  m=0
332                  do k = i-100, i-80
333                     m=m+1
334                     arr(m) = log10(mean(k)+1.0)
335                  enddo
336                  do k = i+80, i+100
337                     m=m+1
338                     arr(m) = log10(mean(k)+1.0)
339                  enddo
340                  call equil(arr,m,val)
341                  if(log10(mean(i)+1.0).gt.1.01*val) then
342                     wt = val/log10(mean(i)+1.0)
343                     smooth(i)=(smooth(i)*wt)**4
344                     smooth(2050-i)=smooth(i)
345                  endif
346               enddo
347
348               do i = 5, 1024
349                  smooth(i) = (smooth(i-1)+smooth(i)+smooth(i+1))/3.0
350                  smooth(2050-i) = smooth(i)
``` autofft.for;1                                                                                    Page 6

```
351            enddo
352
353         else
354
355            do i = 51, 513              ! First look for small peaks
356               m=0
357               do k = i-8, i-5
358                  m=m+1
359                  arr(m) = log10(mean(k)+1.0)
360               enddo
361               do k = i+5, i+8
362                  m=m+1
363                  arr(m) = log10(mean(k)+1.0)
364               enddo
365               call equil(arr,m,val)
366               if(log10(mean(i)+1.0).gt.1.01*val) then
367                  wt = val/log10(mean(i)+1.0)
368                  smooth(i)=(smooth(i)*wt)**2
369                  smooth(1026-i)=smooth(i)
370               endif
371            enddo
372
373            do i = 81, 513              ! Next look for large peaks
374               m=0
375               do k = i-80, i-60
376                  m=m+1
377                  arr(m) = log10(mean(k)+1.0)
378               enddo
379               do k = i+60, i+80
380                  m=m+1
381                  arr(m) = log10(mean(k)+1.0)
382               enddo
383               call equil(arr,m,val)
384               if(log10(mean(i)+1.0).gt.1.01*val) then
385                  wt = val/log10(mean(i)+1.0)
386                  smooth(i)=(smooth(i)*wt)**2
387                  smooth(1026-i)=smooth(i)
388               endif
389            enddo
390         endif
391
392         return
393         end
394
395   c***********************************************************************
396
397         subroutine equil(arr,m,val)
398
399         real     arr(151), val
400         real*8   model(151), b0, b1, sumx, sumxy, sumy, sumxx
401         integer  m
402
403         sumxy = 0.0
404         sumx  = 0.0
405         sumy  = 0.0
406         sumxx = 0.0
407         do j = 1, m
408            sumxy = sumxy + dble(j)*dble(arr(j))
409            sumx  = sumx  + dble(j)
410            sumy  = sumy  + dble(arr(j))
411            sumxx = sumxx + dble(j)**2
412         enddo
413         b1 = (dble(m)*sumxy-sumx*sumy)/(dble(m)*sumxx-sumx**2)
414         b0 = sumy/dble(m) - b1*sumx/dble(m)
415         do j = 1, m
416            model(j) = b0 + b1*dble(j)
417         enddo
418         val = sngl(model(1)+model(m))/2.0
419
420         return
``` autofft.for;1  Page 7

*421*  end
*end*

Appendix II

LOW CONTRAST ENHANCEMENT FOR ELECTRO-OPTIC DATA

ANDREW NEVIS

NAVAL SURFACE WARFARE CENTER
COASTAL SYSTEMS STATION, DAHLGREN DIVISION
PANAMA CITY, FL 32407-7001

ABSTRACT

Laser line scan (LLS) imagery has been found to have fluctuating brightness (contrast) regions due to high/low signal strengths when scanning data. The low signal strength regions can obscure visibility of potential mines, sometimes to the point of preventing identification by an operator inspecting the data. Two contrast enhancement routines have been developed to enhance obscured objects in the low signal strength regions: a background equalization routine that equalizes the high/low signal strength regions and a local histogram clipping routine that applies a moving window histogram clip to enhance details in the low strength regions without effecting the high strength regions.

Keywords: Low contrast enhancement, Background equalization, Histogram clipping, Image enhancement, Electro-optic data

1.0 INTRODUCTION

The electro-optic identification (EOID) sensor was developed for remote identification of proud, partially buried, and moored mines in the shallow and very shallow water regions. EOID is based upon LLS technology and may be deployed in small diameter underwater vehicles. LLS systems produce images by synchronously scanning a narrow beam and a narrow field-of-view (FOV) receiver across the sea bottom. LLS technology effectively reduces detrimental effects of backscatter and blur/glow/forward scatter, leading to underwater images of outstanding resolution, contrast, and range.

Electro-optic (EO) image enhancement techniques are being developed by the Office of Naval Research (ONR) to improve image quality so that mines can be distinguished from associated clutter in difficult turbid coastal water conditions. It is for this reason that the background equalization and local histogram clipping routines were developed. Specifically, these algorithms use local spatial information to enhance poor visibility in low contrast regions expected in EO imagery and will be used as an aid in the mine detection/classification/identification (DCI) process.

2.0 LLS SYSTEM AND IMAGE ENHANCEMENT

The LLS system in the EOID is capable of a 70-deg field-of-view (FOV) scan operation. If the sensor is perpendicular to a reflective surface (i.e., sea bottom) while capturing an image, the resultant image will have high signal strength in the middle and low signal strength on the sides, as shown in Figure 1a [Note that all figures are found at the end of the paper]. This is because when the sensor is perpendicular to the reflective surface, the photons must travel the shortest distance resulting in less scattering effects than the off-angle photons, which must travel further. Consequently, the enhancement routines introduced in this paper have focused on equalizing the image background to obtain a more even brightness across the image, as shown in Figure 1b. This enhances information otherwise obscured by the brightness variation within the image. A secondary objective is to enhance low brightness regions within an image that may contain hidden information without affecting objects already visible in the other regions. Low signal strength regions (in photons) have the same effective result as low contrast regions in greylevel imagery and hence the low signal strength enhancement routines are referred to as low contrast enhancements. Before introducing the background equalization and local histogram clipping algorithms, it is prudent to first discuss some image enhancement routines that will be used by the two low contrast enhancement algorithms.

2.1 Line contrast difference correction

The LLS system captures an image one line at a time. This is accomplished by four mirrors attached to a spindle that reflects returned photons into four channels. Each group of four channels (representing four lines per spindle rotation) has a gain applied to it. Sometimes the scan line effective gains become unequal causing contrast differences between the lines, as shown in Figure 2a. A technique[1] previously introduced by the Coastal Systems Station (CSS) to help correct this line effect follows.

Step 1: Take a one-dimensional (1-D) discrete fourier transform (DFT) along each column (perpendicular to the line contrast difference effect).

Step 2: Take the average magnitude of the DFTs along each row (parallel to the line contrast difference effect).

Step 3: For each column, zero the DFT coefficient which corresponds to an averaged magnitude that exceeds a threshold.

Step 4: Take the inverse 1-D DFT along each column to reconstruct the image.

The disadvantage of this original technique was that for each image, the mean DFT magnitude plot had to be examined to identify the thresholds that would suppress the trouble frequencies. Not only was this a time consuming task, but a different set of thresholds were generated for each image. Also, a side effect caused by this technique was that the DFT coefficients corresponding to trouble frequencies were zeroed out resulting in a slight ringing effect (Gibbs effect) that is common with filters using a sharp cutoff.

To overcome these drawbacks, the line contrast difference correction technique was modified to automatically identify trouble frequencies and to suppress these frequencies proportional to the height of the "spike" in the DFT magnitude plot (the trouble frequencies appear as a spike in the DFT mean magnitude plot). This modified technique is much faster than before since it is automatic and requires no user input. It also gives an improved reduction of the line effect and eliminates the slight ringing effect that occurred in the original method. The modification takes place in step 3 above as follows:

Step 3a: Apply a lowpass filter to the DFT of each column.

Step 3b: Identify trouble frequencies using a linear least squares error method applied to the mean magnitude of the column DFTs.

Step 3c: For each column DFT, suppress the DFT coefficient corresponding to trouble frequencies. Make the suppression proportional to the distance between the mean DFT magnitude and its least squares error estimate.

This line contrast difference correction technique has become a fundamental routine (at CSS) for any image processing algorithm applied to LLS data. A result of this technique is shown in Figure 2b. This routine has been developed to suppress the line effect as much as possible without blurring fine details such as the numbers on the resolution panel. Details of this routine can be found in the full version of this paper[2].

2.2 Outlier noise removal

An outlier noise removal technique was previously introduced[1] to remove impulse type noise sometimes found in the LLS data. This technique compares the difference between each pixel and the average of its eight neighboring pixels. If the difference is greater than a threshold, say 20 percent of the pixel of interest (POI), then it is considered a noise pixel and is replaced by the value of a 5x5 median filter centered about the POI. For previous enhancement routines that were pixel based, the impulse noise suppressed the dynamic range of the image preventing full dynamic range from linear stretching. While the original outlier noise removal technique was successful in reducing the impulse noise enough to help obtain full dynamic range for linear stretching, it is not sufficient when using image enhancement techniques that are based on local spatial filters. This is because the original technique could not effectively distinguish between a noise pixel and an edge pixel. Consequently, the threshold used in the original technique tended to be high to avoid blurring of edges, which resulted in suppressing some of the impulse noise, but not all.

To use enhancement routines that are based on local spatial filters, an improved outlier noise technique was developed. The idea is to look for isolated pixels that stand out from their local backgrounds but are not attached to an edge. This is accomplished by comparing each POI to its neighboring pixels in 24 directions surrounding it, as shown in Figure 3a. Of the 24 values, the neighboring pixels that are closest in value to the POI are chosen to represent the local background. Next, the magnitude difference between the POI and the selected background pixels are compared to a threshold, say 5 percent of the background value. If the POI exceeds the threshold, then it is considered a noise pixel The neighboring pixels are selected from the second and third colinear pixels away from the POI. The two pixels are used to approximate a line with a least squares error method. The background value is obtained by extending the estimated line to the position of the POI, as shown in Figure 3b. The first pixel is skipped to help avoid using a potential noise pixel in computing the background estimate. The assumption here is that the individual noise samples are no wider than three pixels. If $b_k$ represents the background value for direction k and $I_{ij}$ represents the POI, then the magnitude difference $d_k$ between $I_{ij}$ and $b_k$ is $$d_k = | I_{ij} - b_k |.$$

If the minimum magnitude difference of $\{d_k\}_{k=1...24}$ occurs in direction m, the background value chosen to represent $I_{ij}$ is then $b=b_m$. Finally, $I_{ij}$ is declared an outlier pixel (and replaced by its 7x7 median value) if $$|I_{ij} - b| \geq 0.05*b.$$

By comparing the POI to its neighboring pixels in 24 directions surrounding it instead of a single average of its eight neighboring pixels, it is possible to distinguish between isolated noise pixels and edge pixels, as shown in Figure 3c and 3d. (Note that this routine can be extended to small clutter detection.)

2.3 Histogram clipping

Histogram clipping is a common enhancement technique used to increase dynamic range by clipping outlier pixels at the extreme ends of the image histogram. There are two types of histogram clipping possible: cumulative distribution function (CDF) clipping and histogram bin clipping. CDF histogram clipping compares the lower and upper ends of the CDF to a threshold, say 1 percent. Starting at each of the lower and upper ends of the CDF, the CDF values are added until the sum exceeds the threshold. The greylevel value where the CDF first exceeds the threshold defines new lower and upper bounds $(g_{min}, g_{max})$ for a new dynamic range. Any values above $g_{max}$ are clipped to $g_{max}$ and any values below $g_{min}$ are clipped to $g_{min}$. The image is then enhanced by linearly stretching it back to the original dynamic range $(o_{min}, o_{max})$ from the new dynamic range $(g_{min}, g_{max})$. Similarly, histogram bin clipping compares the number of pixels in each bin to a threshold, say 0.1 percent of the number of image pixels. Starting at the lower and upper ends (without summing), the first histogram bin that exceeds the threshold defines new lower and upper bounds $(g_{min}, g_{max})$ for a new dynamic range. Again, the image is clipped and then enhanced by linearly stretching back to the original dynamic range $(o_{min}, o_{max})$ from the new dynamic range $(g_{min}, g_{max})$.

2.4 $Log_{10}$ scale

A pixel-based low contrast enhancement can be applied with a $log_{10}$ function. This is accomplished by first mapping the image from the original dynamic range ($o_{min}, o_{max}$) to the normalized range (0,1). Next, the image is mapped from (0,1) to (0,1) by the function $$\log_{10}[I_{ij}*(10^p-1)+1]/p$$

where $I_{ij}$ is the image pixel values and p is some integer (say 1, 2, or 3). Finally, the image is mapped from (0,1) back to the original dynamic range ($o_{min}, o_{max}$).

3.0 BACKGROUND EQUALIZATION

A previous algorithm[3] was developed to equalize uneven illumination from a laser range-gated camera system. This algorithm was a 1-D variation of a two-dimensional (2-D) version[4] and used a linear least squares error method on the image rows and columns to estimate the image background. Subtracting this background estimate from the image and rescaling to the original dynamic range removes the uneven illumination (or background tilt) from the image. This method is useful for images captured instantaneously from a charge-coupled-device (CCD) array system, which may produce uneven illumination that is nearly planar. However, the wide FOV scan for the LLS system may produce widely differing brightness (contrast) regions within the image. When this is the case, the image background will be nonplanar, making the stated linear background equalization technique inadequate. Hence, a modification from this algorithm was developed by using overlapping linear piecewise line segments of the image rows and columns to give a more accurate estimate of the image background. The least squares error estimate uses piecewise linear line segments to allow for more flexibility in changing regions of the background, while an overlapping technique was used to help reduce edge effects where the line segments connect.

To estimate the background for inut image $I_{ij}$, each row i is modeled by $$I_{ij} \approx [I_i(j)]_1 + [I_i(j)]_2 + \ldots + [I_i(j)]_K$$

and, $$[I_i(j)]_k = c_{1k}j + c_{2k} \quad j = 1, \ldots, N \text{ and } k = 1, \ldots, K$$

where coefficients $c_{1k}$ and $c_{2k}$ are determined by a linear least squares error method, N is the length of the piecewise line segments, and K is the number of the piecewise line segments. The piecewise line segments are overlapped 50%, with the overlapping parts merged together linearly. Thus, the last N/2 pixels of line segment $[I_i(j)]_1$ and the first N/2 pixels of line segment $[I_i(j)]_2$ are merged together by $$(1-wt)*[I_i(j)]_1 + wt*[I_i(j)]_2$$

where, $$wt = (j-N/2)/(N/2) \quad j = N/2, \ldots, N$$

The output of the row estimate is saved to the intermediate array $H_{ij}$. The next step is to estimate the background of the intermediate array $H_{ij}$ by repeating the same least squares error process on its columns and saving the output to background array $B_{ij}$. In this case, each column j is modeled by $$H_{ij} \approx [H_j(i)]_1 + [H_j(i)]_2 + \ldots + [H_j(i)]_K$$

and, $$[H_j(i)]_k = b_{1k}i + b_{2k} \quad i = 1, \ldots, N \text{ and } k = 1, \ldots, K$$

where again the coefficients $b_{1k}$ and $b_{2k}$ are determined by a linear least squares method, N is the length of the piecewise line segments, K is the number of piecewise line segments, and the line segments overlap linearly by 50%. By taking the least squares error estimate first on the image rows and then on the image columns, a 2-D surface ($B_{ij}$) is generated which is used to estimate the image background. The image is then equalized by subtracting the estimated image background $B_{ij}$ from the original input image $I_{ij}$ and rescaling to the original dynamic range.

This process by itself has been found to generate some noise preventing full dynamic range of the output image. Thus, a CDF histogram clip has been added at the end of the algorithm to remove artifact noise. Also, since it is objects obscured in the weak signal regions (low contrast regions) that are of interest, a $log_{10}$ scale routine is applied to the image at the beginning of the algorithm before equalizing the background. The flow diagram of the entire background equalization algorithm is given in Figure 4, while an example of its enhancement is shown in Figure 5. The piecewise line segment size can be modified depending on the expected quality and resolution of features within an image: a shorter line segment size is useful for good resolution and fine details in object features, while a longer size is desirable for poor resolution and blurred details.

4.0 LOCAL HISTOGRAM CLIPPING

Another technique successful at enhancing low contrast regions is to enhance the image based on a local histogram. This technique passes a local window throughout the image computing the histogram (within the local window), clipping outlier pixels, and then linearly stretching proportional to a maximum value within the window. This technique has the advantage of detecting soft (hidden) details on an object. Similar to the background equalization algorithm, this algorithm is preceded by the line contrast difference correction and the $log_{10}$ scale routines to enhance low signal regions, and is followed by a CDF histogram clip (on the entire image) to remove artifact noise that may be generated during processing.

Since the local histogram clipping routine involves computing a histogram within a small window, it is susceptible to noise pixels. For example, the impulse noise described earlier is assumed to be 3 pixels wide. Thus, compared to a 2048x1024 image, an individual noise sample would cover 9 out of 1024*2048=2097152 pixels, or 0.0004%. However, within a 25x25 window, that same noise sample would cover 9 out of 625 pixels, or 1.44%. A single noise sample could be clipped out, but more than one noise sample or the addition of other types of noise would suppress the local enhancement. Therefore two noise filters are applied before computing the local histogram clipping.

4.1 Noise filters

The first filter is the (modified) outlier noise removal routine discussed earlier, which is applied directly to the input image $I_{ij}$. After removing the outlier pixels, $I_{ij}$ is linearly stretched to its full dynamic range. The second noise filter uses a combination of a 7x7 lowpass filter with a 7x7 median filter and is applied to a secondary array, referred to as $Blur_{ij}$ since it is a pseudo blurred version of input image $I_{ij}$. $Blur_{ij}$ is generated as follows. The 7x7 lowpass filter is used to identify if a pixel is noise by $$| I_{ij} - Ilp_{ij} | \geq 0.05 * Ilp_{ij} \Rightarrow I_{ij} \text{ is a noise pixel}$$

where $Ilp_{ij}$ represents the 7x7 lowpass filter applied to $I_{ij}$. If pixel $I_{ij}$ is found to be a noise pixel, then $Blur_{ij}$ is replaced by its 7x7 median filter value. Thus, the secondary array $Blur_{ij}$ is defined by $$| I_{ij} - Ilp_{ij} | \geq 0.05 * Ilp_{ij} \rightarrow Blur_{ij} = Imf_{ij}$$
$$| I_{ij} - Ilp_{ij} | < 0.05 * Ilp_{ij} \rightarrow Blur_{ij} = I_{ij}$$

where $Imf_{ij}$ represents the 7x7 median filter value of $I_{ij}$. The array $Blur_{ij}$ defines the upper and lower boundary values which are used to clip array $I_{ij}$. In addition to suppressing more noise, $Blur_{ij}$ helps enhance the local information so that edge pixels will be outlined. This is because the seconday array, $blur_{ij}$, is used to determine the clipping values, but the actual pixel to be clipped and enhanced is from the input image $I_{ij}$, whose edges have not been changed.

4.2 Moving window clip

The histogram clip within the moving window is similar to the histogram bin clip discussed in section 2.3. However, to accomodate the local clipping routine, the histogram is computed on the secondary array $Blur_{ij}$ within a 25x25 local window (not the entire image). Since there are 625 pixels in the window but 4095 greylevels in the dynamic range (assuming a 12-bit image), the histogram bins were clumped together. Thus instead of comparing an individual histogram bin size to a threshold, clumps of bins were added together and compared to the threshold. The number of histogram bins used in computation is $$\text{bin number} = 4096/(i_m * j_m)$$

where $i_m$ is the row dimension of the window (25) and $j_m$ is the column dimension of the window (25). Also, the threshold used on the number of pixels in the summed histogram bins was computed by $$thr = 0.001 * i_m * j_m$$

The actual pixel to be clipped and stretched is from the input image $I_{ij}$ and not from $blur_{ij}$. Instead of rescaling the new dynamic range $(g_{min}, g_{max})$ back to the original dynamic range $(o_{min}, o_{max})$ as in section 2.3, the pixel is stretched to $(o_{min}, new_{max})$, where $$new_{max} = \log_{10}[99 * g_{max}/4095 + 1] * 4095/2$$

This last step, which is crucial for low contrast enhancement, gives a $\log_{10}$ scale on the upper end of the dynamic range within the window. Thus a locally dependent maximum value is used instead of the original maximum value. This is necessary since using the original maximum value would have the tendancy to enhance too much noise. The window size of the routine can be modified depending on the expected quality and resolution of features within an image. A smaller window size is useful for good resolution and fine details in object features, while a larger window size is desirable for poor resolution and blurred details of object features. The flow diagram of the entire local histogram clipping algorithm is given in Figure 6, while Figure 7 shows an example of its enhancement. The advantage of this routine is that the local histogram clipping algorithm enhances the low contrast regions without reducing features that are already visible.

5.0 CONCLUSION

Due to a wide FOV scan, the LLS EO data is expected to have a wide variation in brightness (contrast) regions throughout an image. Figure 8a shows an image having variable contrast regions that has been enhanced with a common, straightforward method (using ENVI[*] 2% histogram clipping). This image exemplifies the visibility difficulties of objects in low contrast regions and the necessity for new enhancement routines to address this problem. Consequently, two enhancement routines have been developed at CSS that give significant improvement in image quality for images with low contrast regions where potential targets may be obscured: a background equalization routine and a local histogram clipping routine.

Figure 8b and 8c shows the improved enhancement of the two algorithms when applied to the image in Figure 8a. Both algorithms achieve the desired goal of low contrast enhancement, each having its strengths and weaknesses. The background equalization routine gives a smoother and more even equalization of the image

---

[*]For comparative purposes, ENVI software from Research Systems Inc is chosen since it gives a reproducable image enhancement that is independent from CSS.

background than the local histogram clipping routine, which tends to enhance more noise, while the local histogram clipping routine gives less edge effect at high contrast edges and thus is better at preserving features that are already visible. However, the local histogram clipping routine must compute a histogram clipping within a local window about each pixel in an image. Factoring in the noise filters, this routine becomes very computer intensive. The background equalization, on the other hand, is much less intensive and is also very parallelizable. Because of this, the background equalization routine is preferred over the local histogram clipping routine.

Current versions of the background equalization allow for semi-automated enhancement of LLS databases. However, there are several weaknesses that must be overcome before adapting a fully autonomous version. One weakness (in batch mode) is that the current algorithm uses a fixed piecewise line segment size per image in its least squares error estimate of the background. This does not allow enough flexibility to enhance very noisy images, which require longer line segments, and at the same time enhance clean images with fine detail, which require shorter line segments. A solution for this problem is to use a noise measure[b] which automatically determines the line segment length according to the amount of noise present within an image. A second weakness for the background equalization is when there is a high contrast object in the image that is large relative to the background. For this case, a longer line segment is needed to cover the large object, even if there is little noise in the image. A solution for this problem, currently in the development stage, is to modify the algorithm to adapt the line segment length acording to the edges of high contrast objects. But even in its current stage, the background equalization routine has proven to be a valuable aid in the mine identification process.

ACKNOWLEDGEMENTS

This work was sponsored by the Office of Naval Research, Code 322OP (Steve Ackleson), under the electro-optic identification sensor project. The technical agent for this work is the NSWC Coastal Systems Station, Dahlgren Division. The point of contact is Mike Strand (project engineer), code R22, Panama City, FL 32407-7001, phone (904) 235-5457. Also, the author would like to acknowledge Gerry Dobeck at CSS/NSWC, whose concepts and guidance led to this paper.

REFERENCES

[1] A. J. Nevis and G. J. Dobeck, *Image enhancement for mine identification*, CSS TR-94/45

[2] A. J. Nevis, *Low contrast enhancement for electro-optic data*, CSS TR 96/52

[3] A. J. Nevis. *Image characterization and target recognition in the surf zone environment*, CSS TR-96/19

[4] D. Brown, *Status report: electro-optic image processing/analysis*, Penn State University/Applied Research Laboratory

---

[b]A noise measure[3] was introduced which measures the amount of "graininess" present within an image.

I claim:

1. A method of operating an image sensor, comprising:

(a) scanning to produce an image array;

(b) applying a one-dimensional discrete Fourier transform (DFT) to each column of said image array to create a DFT array;

(c) computing a mean magnitude of each column of said DFT array to create a mean magnitude DFT array;

(d) generating a smoothing array having dimensions equal to those of said mean magnitude DFT array;

(e) identifying trouble frequencies associated with line contrast difference effect using a least squares error operation on pixels of said mean magnitude DFT array;

(f) computing suppression values for each pixel associated with said trouble frequencies using information derived from said least squares error operation;

(g) modifying each pixel in said smoothing array corresponding to a pixel in said mean magnitude DFT array associated with said trouble frequencies, based upon a respective one of said suppression values to create a corrected smoothing array;

(h) applying said corrected smoothing array to said DFT array on a pixel-by-pixel basis to create a corrected DFT array; and, (i) applying an inverse DFT to said corrected DFT array to reconstruct a corrected version of said image.

2. The method of claim 1, further comprising:

(j) saving said corrected version of said image for display or storage.

3. The process of claim 2, wherein said image sensor is a laser line scan sensor.

4. The method of claim 3, wherein steps (e) and (f) are carried out a first time for narrow bandwidth trouble frequencies and a second time for large bandwidth trouble frequencies.

5. The method of claim 4, wherein suppression values for narrow bandwidth trouble frequencies and broad bandwidth trouble frequencies are applied to a single smoothing array to create a single corrected smoothing array.

6. The method of claim 5, wherein said smoothing array is originally generated having a value of 1 for all pixel values.

7. The method of claim 6, wherein said least squares error operation of (e) is based upon a difference in a $\log_{10}$ value of a selected pixel and an average of 10 surrounding pixels.

8. The method of claim 7, wherein said 10 surrounding pixels are not immediately adjacent to said selected pixel.

9. The method of claim 8, wherein each said suppression value is based upon said least squares error operation of step (e).

10. The method of claim 9, wherein step (g) is carried out using a low pass filtering operation.

11. The method of claim 6, wherein said originally generated smoothing array is modified using a linear interpolation technique carried out by a low pass filter.

12. An image sensor comprising:

(a) means for scanning to produce an image array;

(b) means for applying a one-dimensional discrete Fourier transform (DFT) to each column of said image array to create a DFT array;

(c) means for computing a mean magnitude of each column of said DFT array to create a mean magnitude DFT array;

(d) means for generating a smoothing array having dimensions equal to those of said mean magnitude DFT array;

(e) means for identifying trouble frequencies associated with line contrast difference effect using a least squares error operation on pixels of said mean magnitude DFT array;

(f) means for computing suppression values for each pixel associated with said trouble frequencies using information derived from said least squares error operation;

(g) means for modifying each pixel in said smoothing array corresponding to a pixel in said mean magnitude DFT array associated with said trouble frequencies, based upon a respective one of said suppression values to create a corrected smoothing array;

(h) means for applying said corrected smoothing array to said DFT array on a pixel-by-pixel basis to create a corrected DFT array; and, (i) means for applying an inverse DFT to said corrected DFT array to reconstruct the corrected version of said image.

13. The image sensor of claim 12, further comprising:

(j) means for saving said corrected version of said image for display or storage.

14. The image sensor of claim 13, wherein said image sensor is a laser line scan sensor.

* * * * *